United States Patent [19]

Ferrell

[11] Patent Number: 5,626,413

[45] Date of Patent: May 6, 1997

[54] HEADLAMP ASSEMBLY

[75] Inventor: Richard M. Ferrell, Livonia, Mich.

[73] Assignee: ADAC Plastics, Inc., Grand Rapids, Mich.

[21] Appl. No.: 553,834

[22] Filed: Nov. 6, 1995

[51] Int. Cl.$^6$ ............................................. F21V 31/00
[52] U.S. Cl. ................ 362/61; 362/267; 362/310; 264/1.9; 264/263
[58] Field of Search ..................... 362/61, 80, 267, 362/310; 264/1.9, 263

[56] References Cited

U.S. PATENT DOCUMENTS

| 2,279,103 | 4/1942 | Anklam | 362/267 |
|---|---|---|---|
| 3,456,103 | 7/1969 | Bond | 362/267 |
| 4,240,131 | 12/1980 | Albrecht | 362/267 |
| 4,336,577 | 6/1982 | Hanson | 362/267 |
| 4,425,607 | 1/1984 | Shanks | 362/310 |
| 4,536,831 | 8/1985 | English et al. | 362/310 |
| 4,674,012 | 6/1987 | Olmos | 362/61 |
| 4,812,955 | 3/1989 | Beswick et al. | 362/240 |
| 4,920,460 | 4/1990 | Mori | 362/61 |
| 5,180,219 | 1/1993 | Geddie | 362/61 |
| 5,321,594 | 6/1994 | Hegemann et al. | 362/310 |
| 5,390,088 | 2/1995 | Tsukada | 362/61 |
| 5,413,743 | 5/1995 | Prophet | 264/1.9 |
| 5,516,390 | 5/1996 | Tomita et al. | 362/267 |

*Primary Examiner*—Ira S. Lazarus
*Assistant Examiner*—Sara Sachie Raab
*Attorney, Agent, or Firm*—Young & Basile, P.C.

[57] ABSTRACT

A headlamp assembly comprising a reflector defining an open front end, a lens adapted to close the open front end of the reflector to form a lamp chamber, a bulb mounted in the lamp chamber, and a mounting structure. The reflector and lens define respective annular flange portions which are seated together at an interface and the mounting structure is formed as an injection molding including an annular main body housing portion surrounding the reflector and an annular seal portion at the inner periphery of the main body portion encapsulating the seated together flange portions so as to seal the interface between the flange portions and seal the lamp chamber. Sealing of the lamp chamber is further facilitated by the provision of a series of annular grooves in the reflector flange portion and a series of annular ribs in the lens flange portion sized to fit in the respective annular grooves in the reflector flange portion.

13 Claims, 3 Drawing Sheets

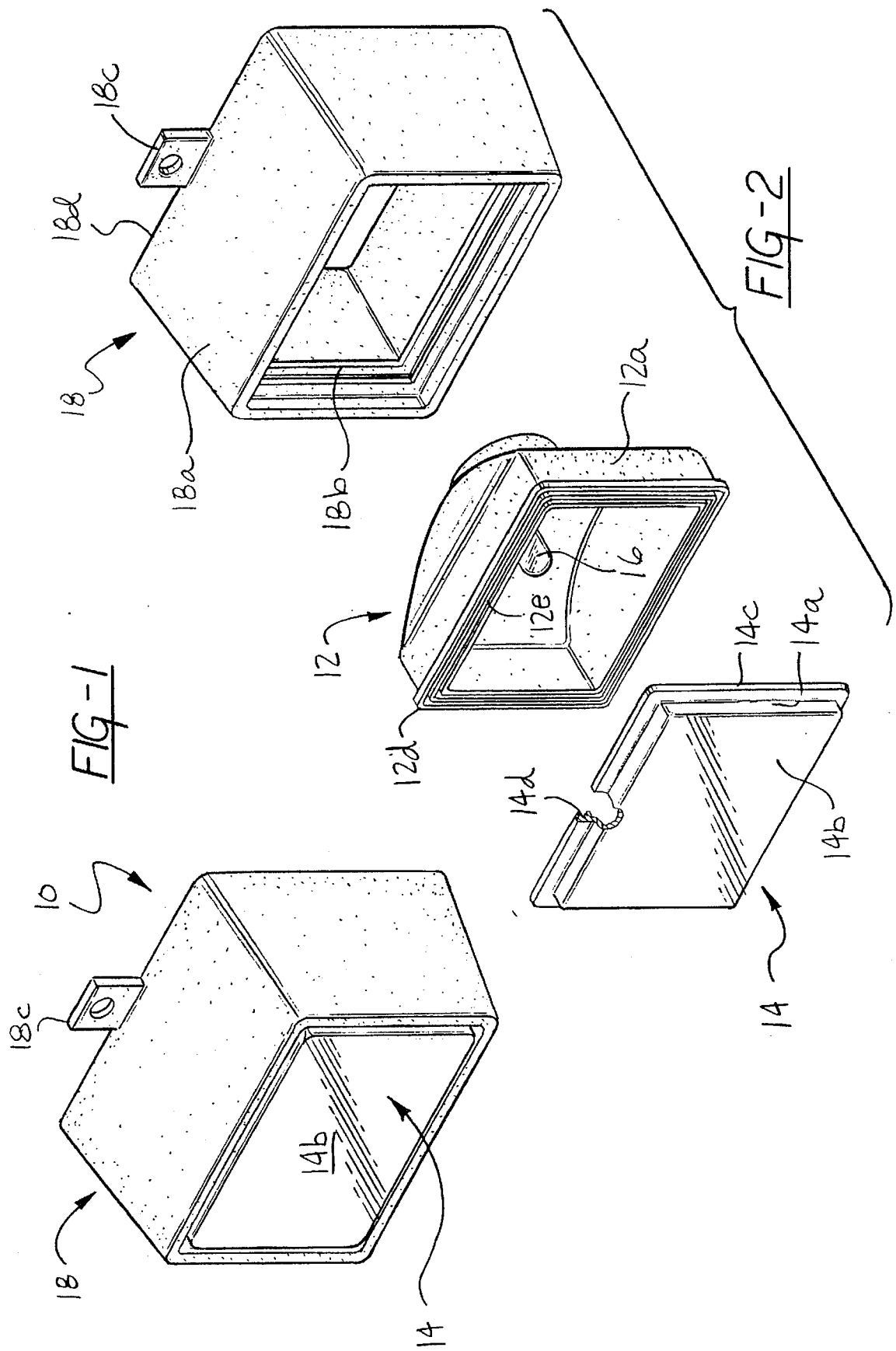

HEADLAMP ASSEMBLY

BACKGROUND OF THE INVENTION

This invention relates to headlamp assemblies and more particularly to an improved headlamp seal.

Automotive headlamps until the late 1930's consisted of a metallic reflector, a replaceable bulb, a glass lens, and some manner of bezel or molding to hold the lens in a position closing the open front end of the reflector. These units were replaced in about the 1939 and 1940 model vehicles by the well known sealed beam units in which the reflector and lens are formed of a single unitary glass structure and the bulb is encapsulated within the structure and is not replaceable. The sealed beam headlamps were legally mandated in the early 1940's by some governmental agencies.

Recently, however, due to pressures from automotive stylists, the mandate has been withdrawn and the stylists are now free to design the many exotic shapes of headlamps that are seen on modern day automobiles. The most typical construction for the new headlamps comprises a metal reflector, a bulb, a plastic lens, and a tongue and groove joint between the lens and the reflector augmented by some manner of adhesive. Problems have developed with this construction and, specifically, as the headlamp is turned on and off repeatedly the trapped air within the lamp heats and cools with a resultant increase and decrease in pressure and this increase and decrease in pressure fatigues the seal between the lens and the reflector, causes the seal to deteriorate, and eventually allows the leakage of moisture into the interior the lamp where it attacks the reflective surface of the reflector and forms beads on the interior surface of the lens which have the effect of scattering the light emitted by the headlamp and interfering with the delicate optical balance that had initially been designed into the lamp.

SUMMARY OF THE INVENTION

This invention is directed to the provision of an improved automotive headlamp.

More specifically this invention is directed to the provision of a headlamp assembly having an improved seal.

The invention relates to a headlamp assembly of the type including a reflector defining an open front end, a lens adapted to close the open front end of the reflector to form a lamp chamber, and a bulb mounted in the lamp chamber.

According to the invention methodology an annular flange portion is formed proximate the front end of the reflector; an annular flange portion is formed on the lens; the flange portions are seated together to form an interface therebetween; and plastic material is injection molded around the exterior periphery of the seated together flange portions to form an annular seal sealing the interface between the flange portions and sealing the lamp chamber. This methodology provides a simple and effective means of sealing the lamp chamber.

According to a further feature of the invention, the assembly further includes a housing surrounding the reflector and the housing is formed in the injection molding step integrally with the annular seal. This methodology provides a housing for the lamp assembly formed simultaneously with the formation of the annular seal for the lamp assembly.

In the disclosed embodiment of the invention the housing includes a main body annular portion surrounding the reflector and the annular seal portion is formed at the inner periphery of the main body portion.

According to a further feature of the invention methodology, the method includes the further steps of forming a series of annular grooves on one of the annular flange portions, forming a series of annular ribs on the other annular flange portion sized to fit in the respective annular grooves, fitting the ribs in the annular grooves as the flange portions are seated together, and thereafter injection molding plastic material around the flange portions to form the annular seal. This methodology forms a headlamp seal including interfitted grooves and ribs augmented by injection molded plastic material encapsulating the interfitted grooves and ribs.

The invention also provides a vehicle headlamp assembly including a reflector defining an open front end, a lens adapted to close the open front end of the reflector to form a lamp chamber, a bulb mounted in the lamp chamber, and a mounting structure to facilitate mounting of the lamp in the vehicle, wherein the reflector and the lens define respective annular flange portions which are seated together at an interface and the mounting structure is formed as an injection molding including an annular seal portion encapsulating the seated together flanges so as to seal the interface between the flanges and seal the lamp chamber. This arrangement simplifies the lamp assembly construction by combining the mounting structure and sealing functions in a single structure.

BRIEF DESCRIPTION OF THE DRAWINGS

FIG. 1 is a perspective view of a headlamp assembly according to the invention;

FIG. 2 is an exploded perspective view of the invention headlamp assembly;

DETAILED DESCRIPTION OF THE PREFERRED EMBODIMENT

Figure 3:
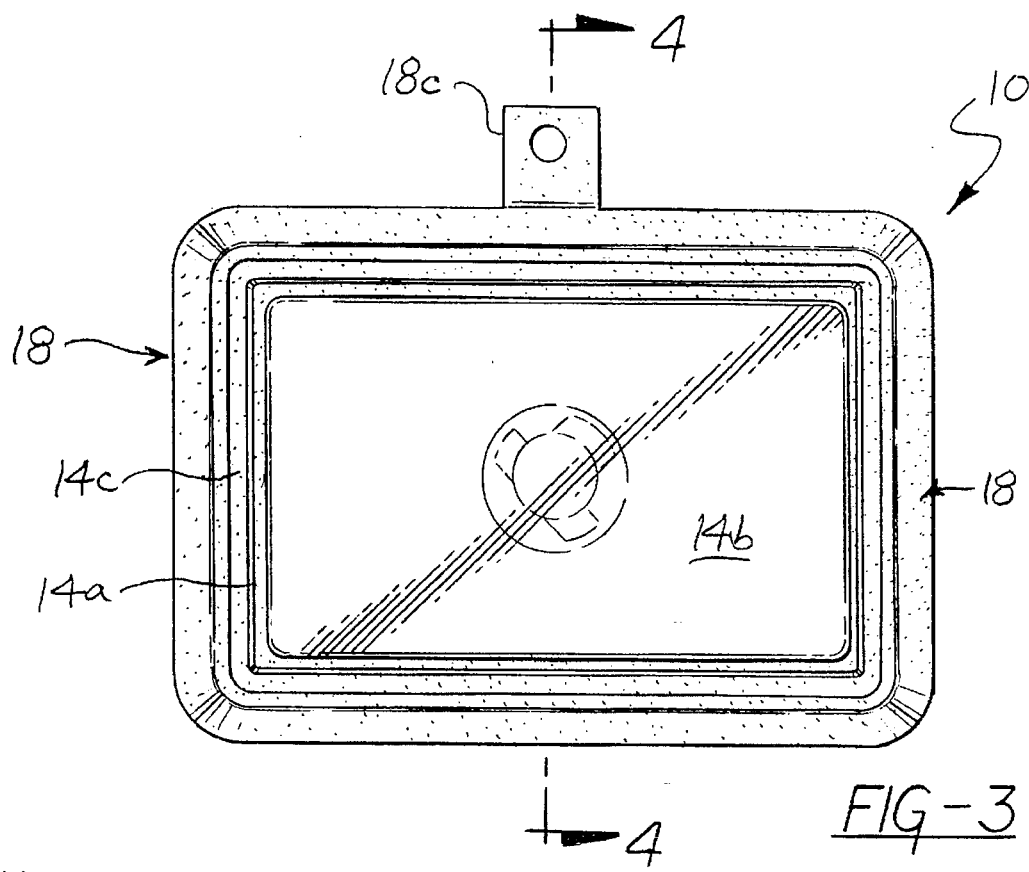
FIG. 3 is a front view of the headlamp assembly.
Figure 4:
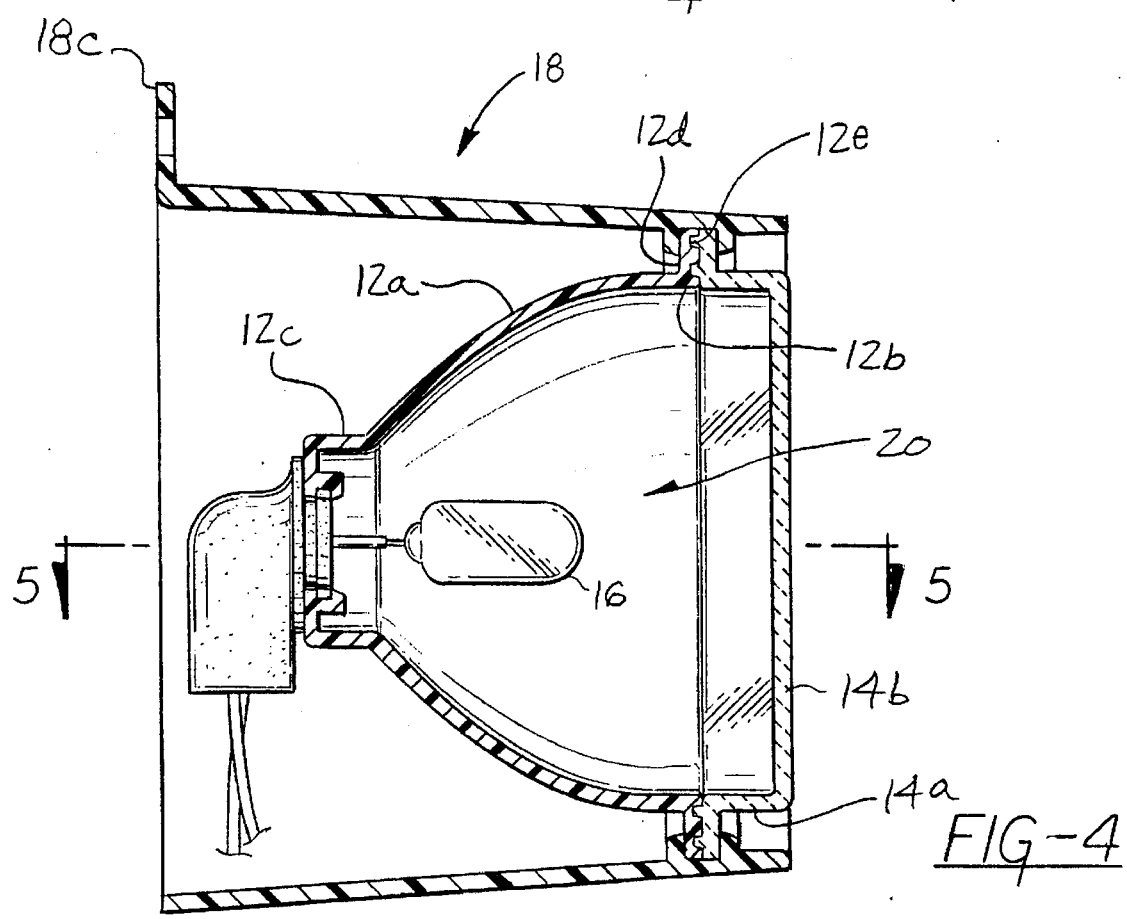
FIG. 4 is a cross-sectional view taken on line 4—4 of FIG. 3.
Figure 5:
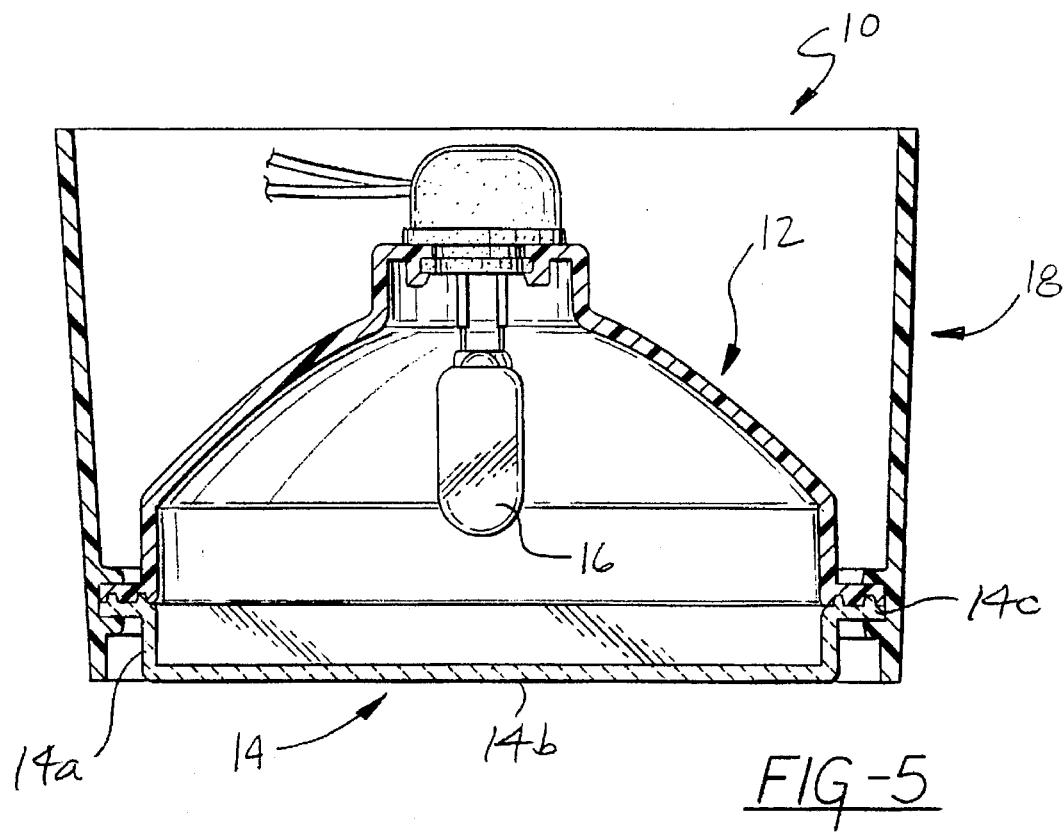
FIG. 5 is a cross-sectional view taken on line 5—5 of FIG. 4.

The invention headlamp assembly 10 is intended for use in a vehicular application and would normally be positioned proximate the front end of the associated vehicle to provide illumination forwardly of the vehicle.

Headlamp assembly 10, broadly considered, includes a reflector 12, a lens 14, a bulb 16, and a mounting structure 18.

Reflector 12 is formed of a suitable plastic material such as a polycarbonate and preferably includes a metallized interior coating to improve the reflective performance of the reflector. Reflector 12 includes a main body portion 12a having a bowl configuration and defining an open front end 12b of rectangular configuration, a rear socket portion 12c, and an annular rectangular flange portion 12d extending outwardly from the main body portion 12a proximate the open front end 12b of the reflector. A series of concentric forwardly opening annular grooves 12e are formed in the forward face of flange portion 12d.

Lens 14 is formed of a suitable transparent plastic material such as polycarbonate and has a size and rectangular configuration corresponding generally to the size and rectangular configuration of the open front end 12b of the reflector so that the lens may close the open front end of the reflector. Lens 14 includes a main body annular rectangular portion 14a, a front rectangular wall 14b, and an annular rectangular flange 14c extending outwardly from the rear edge of main body portion 14a and having a size and rectangular configuration corresponding generally to the size and rectangular configuration of flange portion 12d of the reflector. Flange 14c is formed with a series of concentric annular rearwardly extending rectangular ribs 14d corresponding in size, number and configuration to the annular grooves 12e in reflector flange portion 12d.

Bulb 16 is of conventional construction and is removably received in known manner in the socket portion 12c of the reflector.

To assemble the lamp, a bulb 16 is positioned in socket 12c and flange portion 14c of lens 14 is seated against flange portion 12d of reflector 12 with annular ribs 14d seated respectively in annular grooves 12e so that the ribs and grooves coact to form a labyrinth sealing surface at the interface between the flange portions and thereby seal the lamp chamber 20 formed by the coacting reflector and lens. An annular seal is now formed around the seated together flange portions and mounting structure 18 is formed simultaneously with the formation of the annular seal.

Figure 6:
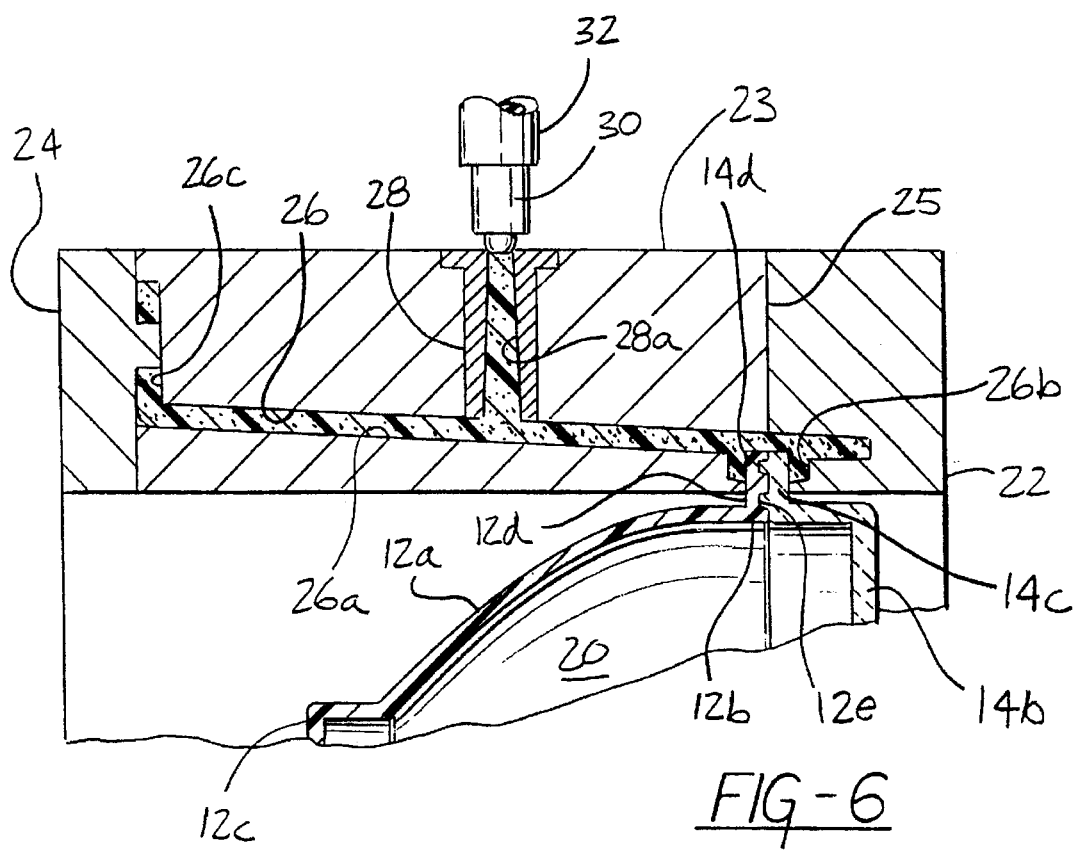
FIG. 6 is a fragmentary cross-sectional view illustrating an injection molding methodology of the invention.

The formation of the annular seal and the simultaneous formation of the mounting structure is performed in an injection molding process as best seen in FIG. 6. Specifically, a front annular mold part 22 is positioned in surrounding relation to the lens forwardly of the seated together flange portions, a central mold part 23 is positioned in surrounding relation to the reflector rearwardly of the seated together flange portions, and a rear mold part 24 is positioned against the rear face of central mold part 23. Mold parts 22, 23 and 24 coact to define part lines 25 and an annular mold cavity 26.

Mold cavity 26 includes a main body generally planar annular portion 26a, an annular seal portion 26b proximate the forward end of the mold cavity, and one or more mounting flange portions 26c proximate the rearward end of the mold cavity. Molten plastic, such for example as polycarbonate, is injected into cavity 26 in known manner utilizing a sprue bushing 28, defining a sprue 28a, in coaction with an injection nozzle 30 communicating with an injection molding machine 32. The molten plastic flowing through sprue 28a enters cavity 26 and fills planar cavity portion 26a, mounting flange cavity portions 26c, and sealing cavity portion 26b. The molten plastic filling sealing cavity portion 26b surrounds flange portions 12d, 14c and encapsulates the exterior periphery of the flange portions to form an annular seal sealing the interface between the flange portions and thereby sealing lamp chamber 20.

After the injection molded plastic has cured the mold parts are separated at part lines 25 to define an annular rectangular main body portion 18a, defined by the planar portion 26a of the mold cavity, an annular seal portion 18b at the forward interior of main body portion 18a, formed by the seal portion 26b of the mold cavity, and one or more mounting flange portions 18c proximate the rear edge 18d of the main body portion. Main body portion 18a will be seen to define a housing structure surrounding the reflector and mounting flange portions 18c are utilized to facilitate mounting of the headlamp assembly in the associated vehicle.

The invention will be seen to provide important advantages. Specifically, the use of an injection molded annular seal around the seated together flange portions of the reflector and lens provides a simple and effective structure and methodology for sealing the interface between the flange portions and thereby sealing the chamber of the lamp. Further, the formation of the mounting or housing structure of the lamp in the same injection molding operation in which the annular seal is formed simplifies the construction and assembly of the lamp.

Whereas a preferred embodiment of the invention has been illustrated and described in detail it will be apparent that various changes may be made in the disclosed embodiment without departing from the scope or spirit of the invention.

I claim:

1. A method of forming a headlamp assembly, the headlight assembly including a reflector defining an open front end and having an annular flange portion formed proximate the front end of the reflector, a lens adapted to close the open front end of the reflector to form a lamp chamber and having an annular flange portion formed on the lens, and a bulb mounted in the lamp chamber, said method including the steps of:

seating the flange portions together to form an interface therebetween; and injection molding plastic material around an exterior periphery of the seated together flange portions to form an annular seal sealing the interface between the flange portions and sealing the lamp chamber.

2. A method according to claim 1 wherein:

the assembly further includes a housing surrounding the reflector; and further including the step of forming the housing in the injection molding step integrally with the annular seal.

3. A method according to claim 2 wherein the housing includes a main body annular portion surrounding the reflector and the annular seal portion is formed at an inner periphery of the main body portion.

4. A method according to claim 1 wherein the method includes the further steps of forming a series of annular grooves in one of the annular flange portions, forming a series of annular ribs on the other annular flange portion sized to fit in the respective annular grooves, fitting the ribs in the annular grooves as the flange portions are seated together, and thereafter injection molding plastic material around the flange portions to form the annular seal.

5. A method according to claim 1 wherein the assembly further includes a mounting structure to facilitate mounting of the lamp in a vehicle and further including the step of forming the mounting structure in the injection molding step integrally with the annular seal.

6. A headlamp assembly comprising a reflector defining an open front end, a lens adapted to close the open front end of the reflector to form a lamp chamber, a bulb mounted in the lamp chamber, and a housing surrounding the reflector, characterized in that:

the reflector and the lens define respective annular flange portions which are seated together at an interface; and the housing is formed as an injection molding including an annular seal portion encapsulating the seated together flange portions so as to seal the interface between the flange portions and seal the lamp chamber.

7. A headlamp assembly according to claim 6 wherein one of the flange portions defines a series of annular grooves and the other flange portion defines a series of annular ribs sized to fit in the respective annular grooves.

8. A headlamp assembly according to claim 6 wherein:

the housing includes a main body annular portion surrounding the reflector; and the annular seal portion is formed at the inner periphery of the main body portion.

9. A headlamp assembly according to claim 8 wherein the housing further includes at least one mounting bracket portion formed integrally with and extending outwardly from the main body portion.

10. A vehicle headlamp assembly comprising a reflector defining an open front end, a lens adapted to close the open front end of the reflector to form a lamp chamber, a bulb mounted in the lamp chamber, and a mounting structure to facilitate mounting of the lamp in the vehicle, characterized in that:

the reflector and the lens define respective annular flange portions which are seated together at an interface; and the mounting structure is formed as an injection molding and includes an annular seal portion encapsulating the seated together flange portions so as to seal the interface between the flange portions and seal the lamp chamber.

11. A headlamp assembly according to claim 10 wherein one of the flange portions defines a series of annular grooves and the other flange portion defines a series of annular ribs sized to fit in the respective annular grooves.

12. A headlamp assembly according to claim 10 wherein:

the mounting structure includes a housing including a main body annular portion surrounding the reflector; and the annular seal portion is formed at the inner periphery of the housing main body portion.

13. A headlamp assembly according to claim 12 wherein the mounting structure further includes at least one mounting bracket portion formed integrally with and extending outwardly from the housing main body portion.

* * * * *